United States Patent
Garner et al.

(10) Patent No.: US 8,244,136 B2
(45) Date of Patent: *Aug. 14, 2012

(54) SYSTEM AND METHOD FOR REDUCTION OF INFRARED NOISE DURING COMMUNICATION BETWEEN CONSUMER APPLIANCES

(75) Inventors: Scott Garner, Huntington Beach, CA (US); Graham Williams, Corona Del Mar, CA (US); William L. Brown, Yorba Linda, CA (US)

(73) Assignee: Universal Electronics Inc., Cypress, CA (US)

( * ) Notice: Subject to any disclaimer, the term of this patent is extended or adjusted under 35 U.S.C. 154(b) by 1063 days.

This patent is subject to a terminal disclaimer.

(21) Appl. No.: 12/059,550

(22) Filed: Mar. 31, 2008

(65) Prior Publication Data
US 2009/0245803 A1   Oct. 1, 2009

(51) Int. Cl.
*H04B 10/00* (2006.01)

(52) U.S. Cl. ........ 398/106; 398/107; 398/109; 398/119; 398/159

(58) Field of Classification Search .................. 398/159, 398/115, 116, 106–110, 118, 119, 120, 123, 398/127, 158; 340/543.3
See application file for complete search history.

(56) References Cited

U.S. PATENT DOCUMENTS

| | | | |
|---|---|---|---|
| 7,194,209 B1 | 3/2007 | Robbins et al. | |
| 7,266,301 B2 | 9/2007 | Stanchfield et al. | |
| 7,814,510 B1 * | 10/2010 | Ergen et al. | 725/38 |
| 2003/0005462 A1 * | 1/2003 | Broadus et al. | 725/110 |
| 2004/0052524 A1 * | 3/2004 | Arnold | 398/38 |
| 2005/0047794 A1 | 3/2005 | Quintanar | |
| 2005/0132291 A1 | 6/2005 | Wagner et al. | |
| 2005/0190073 A1 * | 9/2005 | Berges et al. | 340/825.72 |
| 2007/0069918 A1 | 3/2007 | You | |

* cited by examiner

*Primary Examiner* — M. R. Sedighian
(74) *Attorney, Agent, or Firm* — Greenberg Traurig, LLP

(57) ABSTRACT

A system and method for facilitating infrared (IR) communications from a first device, such as a set top box, to a second device, such as a remote control, in the presence of an IR noise generating device, such as a plasma television, by using at least one of the first device and the second device to actively reduce a level of IR noise being generated by the IR noise generating device during an IR transmission from the first device to the second device.

21 Claims, 10 Drawing Sheets

SYSTEM AND METHOD FOR REDUCTION OF INFRARED NOISE DURING COMMUNICATION BETWEEN CONSUMER APPLIANCES

BACKGROUND

Controlling devices, that is, for example, remote controls capable of commanding operation of features and functions of consumer electronic appliances such as TVs, audio receivers, set top boxes, home automation systems, and the like, are well known in the art and have become a ubiquitous part of the modern home. Increasingly, the utility of these devices is being enhanced by providing for two-way communication between a controlling device and at least one of the controlled appliances.

A historically preferred communication medium for such controlling devices is infrared, since this technology is relatively inexpensive, does not radiate outside of the user's immediate environment, and has proven reliable in existing unidirectional and low data rate applications. However, newer display technologies such as plasma TV screens are themselves strong sources of infrared radiation and may be problematic during two-way infrared-based communication between a controlling device and an appliance, in particular with respect to the infrared receiver in the controlling device which is likely to be pointed directly toward the vicinity of the TV screen while in use.

SUMMARY OF THE INVENTION

This invention relates generally to two-way infrared (IR) communication while in the presence of an appliance, such as a plasma TV, known to radiate noise in the infrared portion of the electromagnetic spectrum. In an exemplary system, a controlling device is adapted to communicate bi-directionally with a controlled appliance, e.g., a cable set top box, in order to perform activities such as interactive setup, downloading of upgraded appliance control data, favorite channel logos, program guide information, etc. Based upon an observed relationship between the video content being presented on a plasma TV screen and the amount of infrared noise being radiated by that video content, IR communication may be facilitated by adjusting the content that is being presented on the plasma TV during periods of data transmission from the appliance to the controlling device.

A better understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which.

DETAILED DESCRIPTION

Figure 1:
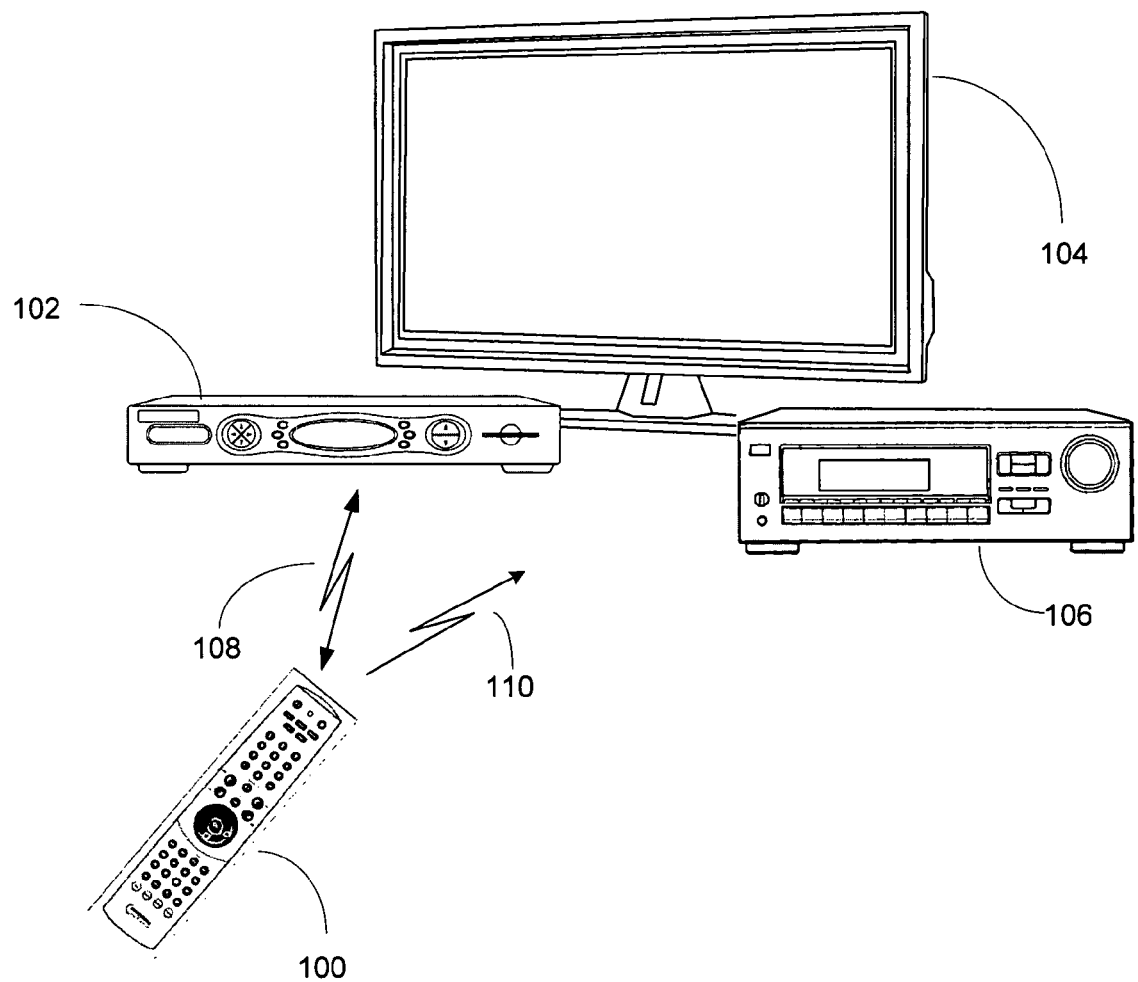
FIG. 1 illustrates a system in which an exemplary controlling device and exemplary controlled appliances communicate using the principles of the instant invention.

The following describes a system and methods by means of which a controlling device such as a remote control may engage in improved bi-directional infrared communication with an appliance while in the presence of a device known to be a source of infrared noise, for example a plasma screen TV. By way of example, FIG. 1 illustrates an exemplary system wherein a controlling device 100 may be used to command functions of various appliances such as an AV receiver 106, a television 104, a set top box 102, etc. While not required, the controlling device 100 may be provided with the set top box 102. Controlling device 100 is also capable of bi-directional communication 108 with the set top box 102 in order to perform interactive set up activities and/or download data items such as upgraded infrared commands, program guide information, channel logos, etc. While illustrated in the context of an A/V receiver 106, a television 104, and a set top box 102, it is to be understood that controllable appliances may include, but are not limited to, televisions, VCRs, DVRs, DVD players, cable or satellite converter set-top boxes ("STBs"), amplifiers, CD players, game consoles, home lighting, drapery, fans, HVAC systems, thermostats, personal computers, etc. It will also be appreciated that, while in the illustrative embodiment the set top box 102 is configured to communicate bi-directionally with controlling device 100, in alternative embodiments this function may be performed equally well by any other appliance, provided such appliance is capable of directly or indirectly causing modification of the video content being presented on television 104.

In the embodiment illustrated, controlling device 100 communicates with other controlled devices 104, 106 via a unidirectional infrared (IR) link 110, however, as is known in the art controlling device 100 may be capable of communicating with these appliances using any convenient IR, RF, point-to-point, or networked protocol to cause the appliances to perform operational functions, provided the control protocols and command values to be used in communicating with a desired appliance are known to the operational software of controlling device 100.

Figure 2:
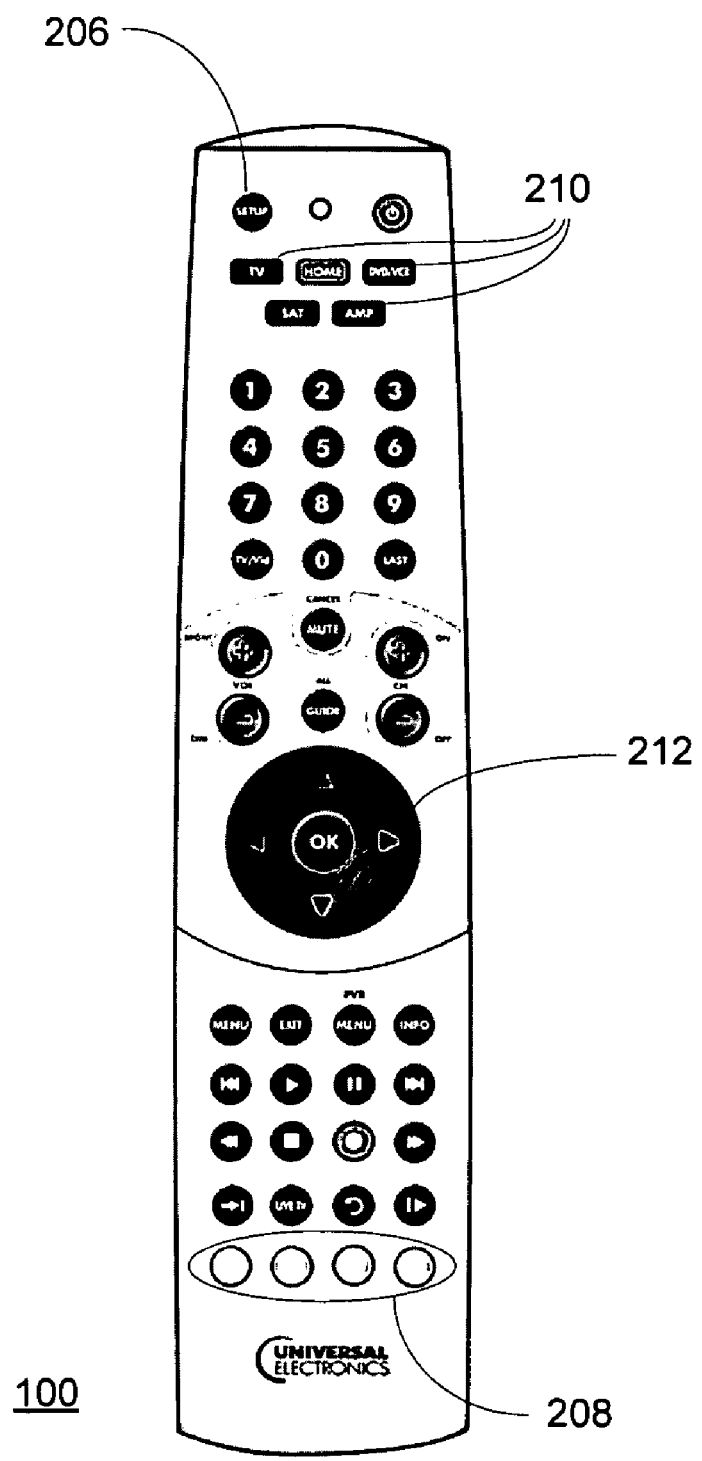
FIG. 2 illustrates the exemplary controlling device of FIG. 1.

With reference to FIG. 2, an exemplary controlling device 100 may include, in addition to keys corresponding to controllable functions of appliances 102, 104, 106, etc., special purpose keys such as programmable keys 208 whose functionality may be altered and/or enabled via interactive communication with the set top box 102 (e.g., as described in U.S. Pat. No. 7,154,428 "Remote Control with Selective Key Illumination," of like ownership and incorporated herein by reference in its entirety), a set up key 206 which may initiate an interactive configuration transaction with set top box 102, etc.

Figure 3:
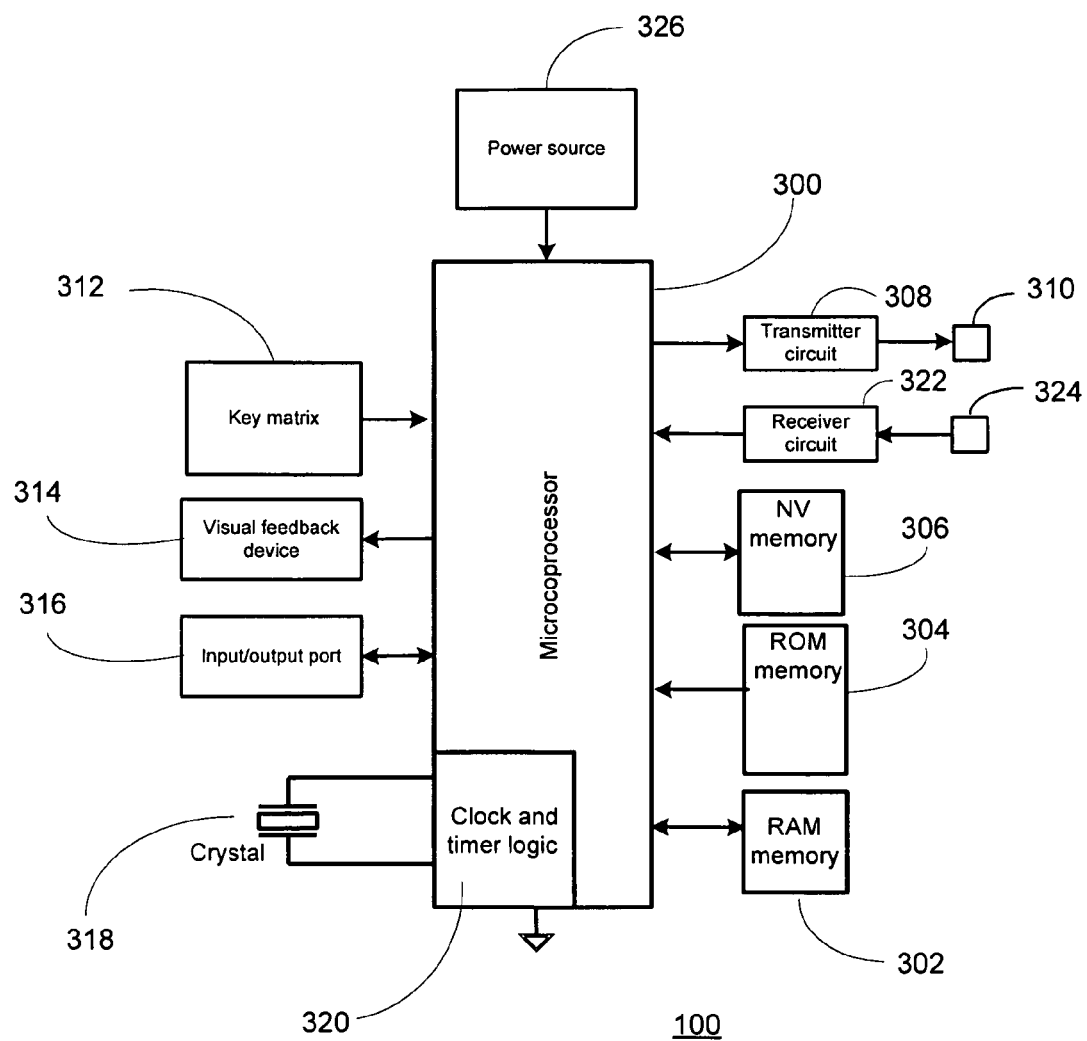
FIG. 3 illustrates a block diagram of exemplary components of the exemplary controlling device of FIG. 1.

With reference to FIG. 3, for use in commanding the functional operations of one or more appliances, the controlling devices 100 may include, as needed for a particular application, a processor 300 coupled to a ROM memory 304, a RAM memory 302, a key matrix 312 (e.g., hard keys, soft keys such as a touch sensitive surface overlaid on a liquid crystal (LCD) or an electroluminescent (EL) display, or some combination thereof), a transmission circuit 308 and associated IR emitter 310, a receiver circuit 322 and associated IR detector 324, a non-volatile read/write memory 306, a means 314 to provide feedback to the user (e.g., one or more visible LEDs, LCD display, speaker, key illumination LEDs for programmable keys 208, backlighting, and/or the like), a power source 326, an input/output port 316 such as a serial interface, modem, USB port, etc., and clock and timer logic 320 with associated crystal or resonator 318.

As will be understood by those skilled in the art, some or all of the memories 302, 304, 306 may include executable instructions (collectively, the program memory) that are intended to be executed by the processor 300 to control the operation of the remote control 100, as well as data that serves to define the aforementioned control protocols and command values to the operational software (collectively, the command data). In this manner, the processor 300 may be programmed to control the various electronic components within the remote control 100, e.g., to monitor the power supply 310, to cause the transmission and reception of signals, control visual feedback device(s) 314, etc. All or part of the non-volatile read/write memory 306, for example an EEPROM, battery-backed up RAM, FLASH, Smart Card, memory stick, or the like, may additionally be used to store setup data and parameters as necessary. While the memory 304 is illustrated and described as a ROM memory, memory 304 may also be comprised of any type of readable media, such as ROM, FLASH, EEPROM, or the like. Preferably, the memories 304 and 306 are non-volatile or battery-backed such that data is not required to be reloaded after battery changes. In addition, the memories 302, 304 and 306 may take the form of a chip, a hard disk, a magnetic disk, an optical disk, and/or the like. Still further, it will be appreciated that some or all of the illustrated memory devices may be physically incorporated within the same IC chip as the microprocessor 300 (a so called "microcontroller") and, as such, they are shown separately in FIG. 3 only for the sake of clarity.

To cause the controlling device 100 to perform an action, controlling device 100 is adapted to be responsive to events, such as a sensed user interaction with the key matrix 312, etc. In response to an event, appropriate instructions within the program memory (hereafter the "operating program") may be executed. For example, when a function key is actuated on the controlling device 100, the controlling device 100 may retrieve from the command data stored in memory 302, 304 and/or 306 the command value and control protocol currently assigned to the actuated function key and the currently assigned device mode, to thereby transmit a command to an intended target appliance, e.g., the STB 102 or the TV 104, in a format recognizable by the intended target appliance.

In certain embodiments, controlling device 100 may be universal, that is adaptable to issue commands to a multiplicity of appliances of different type and/or manufacture. In such cases, for selecting a set of command data to be associated with an appliance to be controlled, data may be provided to the controlling device 100 that serves to identify an intended target appliance by its type and make (and sometimes model). Such data allows the controlling device 100 to identify the appropriate command data within a preprogrammed library of command data that is to be used to transmit recognizable commands in a format appropriate for such identified appliances. Multiple methods for providing such setup data may be supported by the controlling device 100, including some or all of the known setup procedures described, for example, in U.S. Pat. Nos. 4,959,810, 5,614,906, and 6,225,938 which describe self-contained setup of controlling devices, and U.S. patent application Ser. Nos. 09/804,623 and 09/615,473 which describe setup of controlling devices by interaction with a Web site. It will also be appreciated that the controlling device 100 may be set up to command operations of an appliance 104, etc. by being taught the command codes needed to command such appliance as described in U.S. Pat. No. 4,623,887. Alternatively, controlling device 100 may be set up to command operations of an appliance 104 via interaction with another appliance, e.g., the set top box 102, as further described hereinafter. Still further, it will be understood that command data may be pre-stored in the controlling device 100 or the controlling device 100 may be upgradeable with new command data and/or operating program instructions, for example by transfer via external input port 316 as described for example in the aforementioned U.S. Pat. No. 4,959,810, or by transfer from the set top box 102 via the two-way communication link components 308, 310 and 322, 324.

Figure 4:
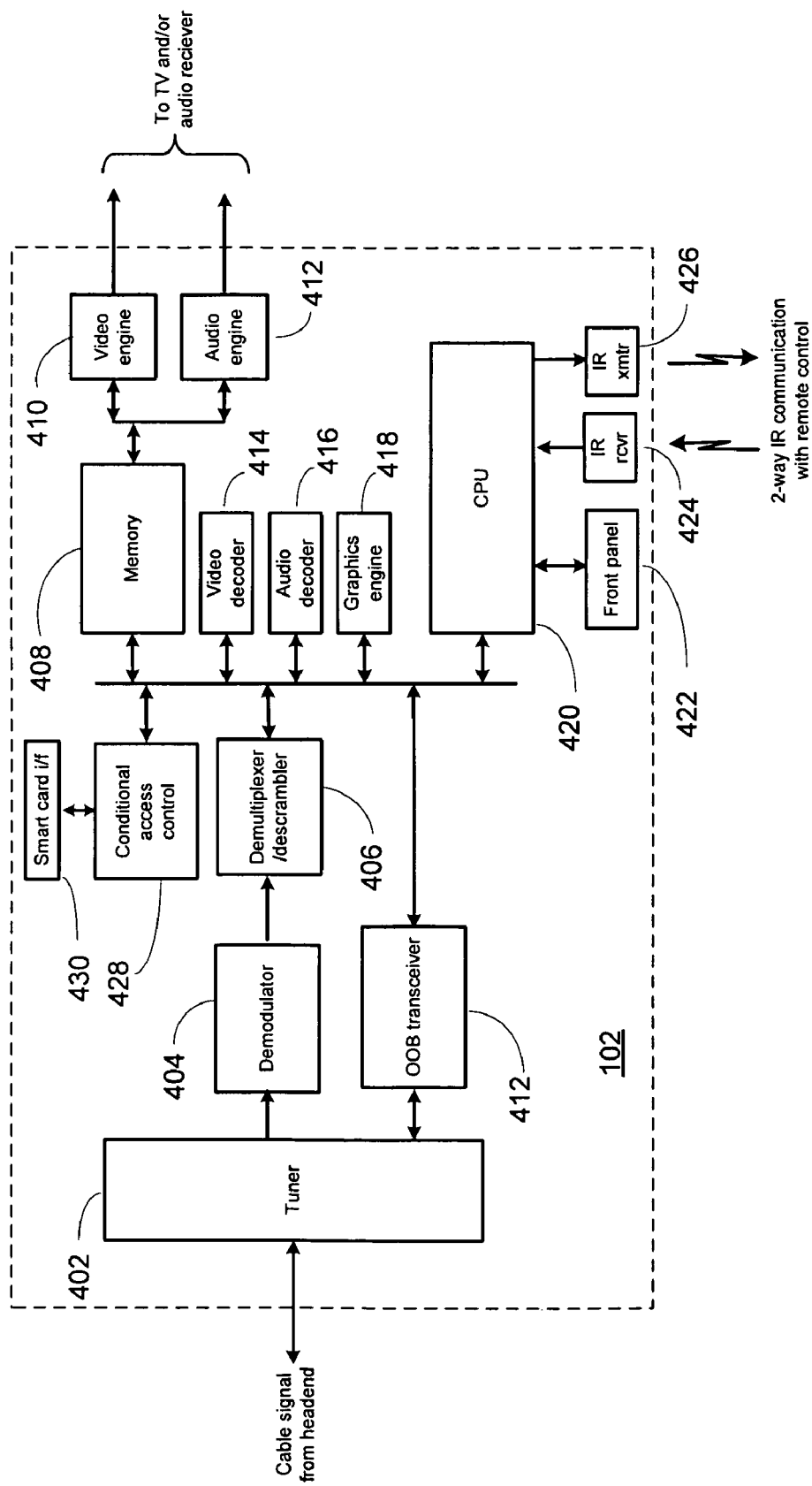
FIG. 4 illustrates a block diagram of exemplary components of an exemplary set top box appliance of FIG. 1.

An exemplary architecture of a set top box (e.g., the set top box 102) suitable for use in the system of FIG. 1 and implementation of the features described hereinafter is illustrated in FIG. 4. Such a set top box may include a cable system interface comprising a tuner 402 for selection of a particular signal originating from a cable system head end; a demodulator 404 for demodulating that signal (e.g., a QAM encoded bit stream) into binary data; a demultiplexer 406 for separating the resulting binary data stream into it's constituent parts (e.g., MPEG encoded video, AC3 encoded audio, etc.); and an out of band transceiver 412 for transfer of control information, software updates, program guide data, etc.; all under the control of a processor 420 responsive to an operating program resident in memory 408. A conditional access controller 428 may also be provided to decrypt and/or otherwise enable various tiers of subscription service, in some embodiments in conjunction with an access card 430. Also under the control of the processor 420 and the operating program, received media data is decoded by video and audio decoders 414, 416 and provided to video and audio output engines 410, 412 for rendering on, for example, television 104. Additionally, a graphics engine 418 may be provided to allow the processor and operating program to display locally-sourced information, e.g., guide data, set up menus, status messages, etc., either overlaid onto, in conjunction with, or in place of the media stream currently being received. For user interface purposes, a front panel 422 and a two-way remote control communication link receiver 424 and transmitter 426 are provided. Set top box memory 408 may comprise RAM, ROM, FLASH, EEPROM, optical storage, magnetic storage, or any combination thereof, and may take the form of a chip, smart card, memory stick, hard disk, magnetic disk, optical disk, and/or the like. Set top box memory 408 may store software instructions for controlling the functions of the set top box 102 (i.e. an operating program); application programs (e.g., program guides, games, device setup applications, help menus, etc.) which may be permanently retained in the memory or may be transient, e.g., temporarily provisioned via out of band transceiver 412, access card 430, etc.; data for use in such operations (e.g., channel-line up, program guide information, etc.); user preference information and settings; display templates and graphics for menus or messages; etc. Additionally, portions of set top box memory 408 may serve as buffers for incoming and outgoing media data streams as they are decoded, processed and output to connected devices.

Figure 5:
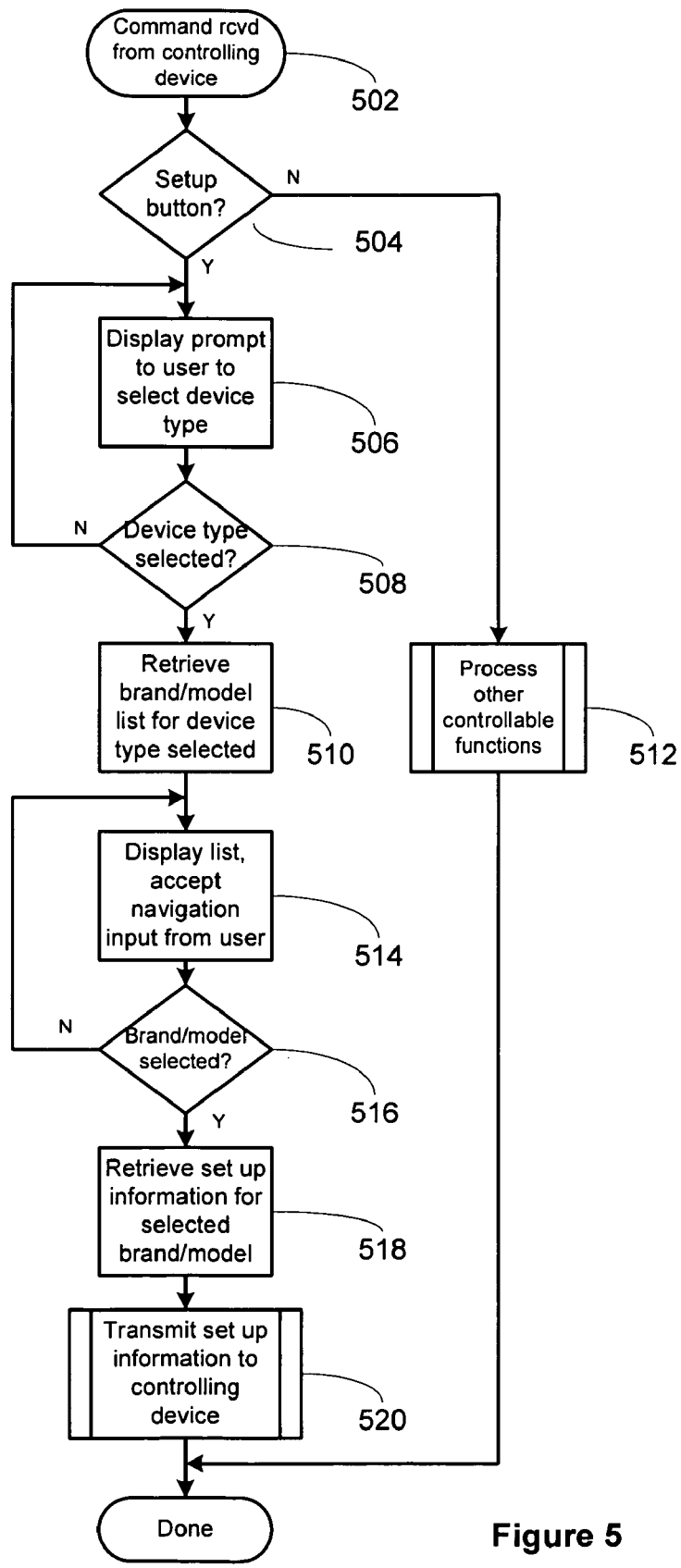
FIG. 5 illustrates in flow chart form an exemplary method for interactive setup of an exemplary controlling device.

As mentioned above, the exemplary set top box architecture presented in conjunction with FIG. 4 may support specialized application programs in addition to the conventional channel tuning and media decoding functionality as is well known in such devices. By way of example, an additional program supported by the cable set top box 102 may be an interactive remote control setup application as generally illustrated in the flowchart of FIG. 5. Such an application may be offered to facilitate the configuration of a universal controlling device to match the universal controlling device to specific appliances to be controlled, for example to configure the controlling device 100 to correctly operate audio receiver 106 and TV 104. When a user of controlling device 100 activates a setup button 206, controlling device 100 may transmit a command signal indicative of this action to the set top box 102, initiating a bi-directional communication session with the set top box 102. Upon receipt 502 of such a signal, the set top operating program may first check 504 if the received signal is a set up command. If not, the signal is processed as a remotely controllable command function 512 as is well known in the art.

If, however, the received signal comprises a set up request, the set up application is invoked. By way of example only, the set up application may cause display on TV 104 (via graphics and video engines 418, 410) a prompt requesting the user to select a device type to be set up. The user may indicate the desired selection, for example, by activating one of the device selection buttons 210 on controlling device 100, by navigating a displayed menu, etc. When the resultant signal representative of the desired device type is received 508 at the set top box, the set up application may retrieve a list of brands and/or models corresponding to available IR codes for that type of device. Such a list may be pre-stored in memory 408 as part of the set up application data, or may be retrieved from a library of codes available at a remote server accessible, for example, via out of band transceiver 412. Once in possession of the data, the set up application may display this 514 in user-scrollable list form on TV 104. The user may then use the navigation pad 212 of controlling device 100 to scroll to and select 516 their appliance brand and/or model from the list. Once the selection has been received, the set up application may retrieve the set up information for the desired brand and/or model. Such set up information may comprise, without limitation, a pointer, reference, or other indicia to a set of infrared command data already stored in one or more of the memories 302, 304, 306 of controlling device 100; a downloadable set of infrared command data stored locally in set top box memory 408; or a downloadable set of infrared command data retrieved from a database available at a remote server via, for example, out of band transceiver 412. Once in possession of the appropriate set up information, the set up application may transfer this information to the controlling device 100 for use by the controlling device 100 to complete the configuration process.

To conduct this interaction and data transfer, set top box 102 and controlling device 100 may use any convenient bi-directional infrared protocol, as are well known in the art. For additional information regarding such protocols, the interested reader may however turn to U.S. Pat. No. 7,167,913 "System and Method for Managing Communication Links" of like assignee and incorporated herein by reference in its entirety, or to U.S. Pat. No. 5,455,570 "Methods and Apparatus for Communication Program Data Signals Via a Remote Control Unit." Further, in keeping with the teachings of the instant invention, set top box 102 may incorporate measures to reduce potential IR noise radiation from connected display devices such as, for example, plasma TV screens, as further described hereafter.

It will be appreciated by those of skill in the art that various alternative embodiments of set top box architecture are possible, as are added features such as for example dual tuners, DVR capability, Ethernet or WiFi network interfaces, etc., and various other specialized applications, for example set top box controllable key functions 208 and/or displays on controlling device 100, as are described in greater detail in U.S. Pat. No. 7,154,428 "Remote Control with Selective Key Illumination," of like assignee and incorporated herein by reference in its entirety. It will also be appreciated that the architecture and applications described in conjunction with FIGS. 4 and 5 are not limited to cable set top boxes, but may apply mutatis mutandis to similar devices having the capability of receiving satellite or digital terrestrial broadcasts, having network connectivity capabilities, and/or having media playback capabilities (whether stand alone or via interconnection with a display device), etc., such as a game console, a "cable ready" TV, a DVR, etc. Accordingly, it is to be understood that the examples presented are illustrative of one of many possible platforms upon which the methods of the instant invention may be practiced, and are not intended to be limiting.

Figure 6A:
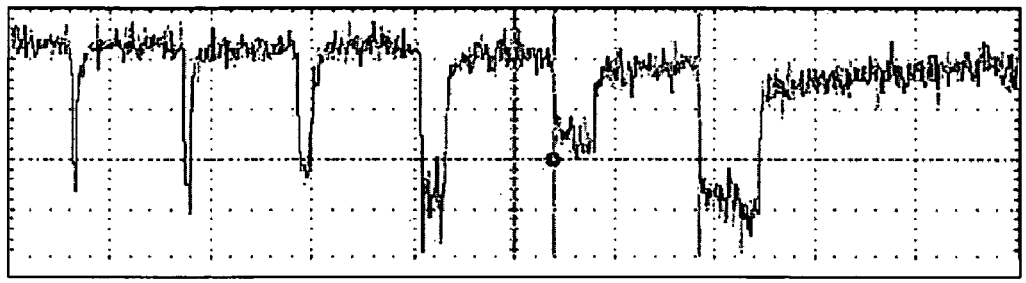
FIG. 6 illustrates exemplary waveform patterns and intensities of infrared noise produced by a plasma TV screen.
Figure 6B:
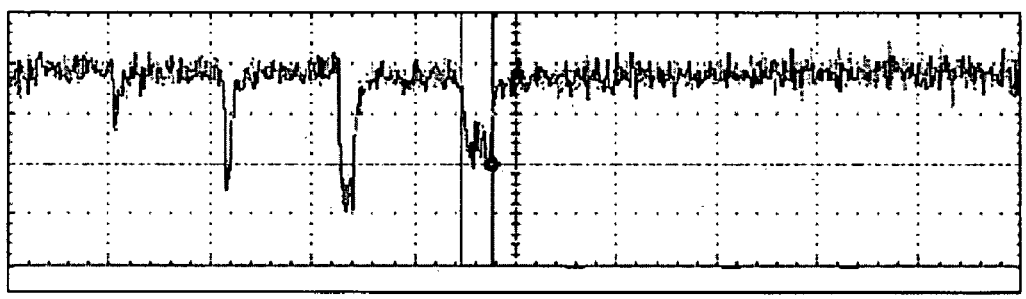
Figure 6C:
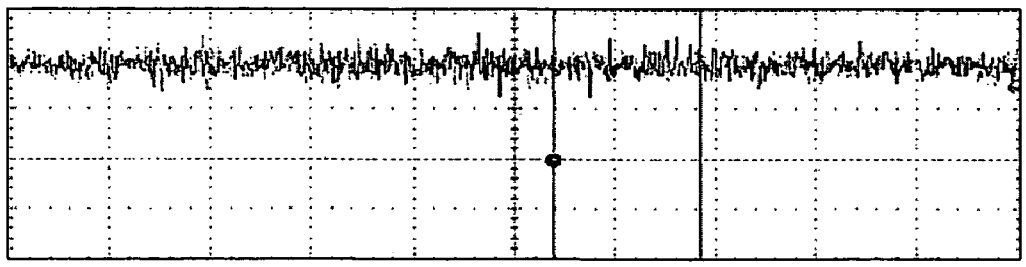

The level of infrared noise generated by a plasma TV display screen may be empirically determined to be dependent on the brightness and, to a lesser extent, the colors of the video content being displayed. By way of example, FIGS. 6*a* through 6*c* illustrate the output of an infrared detector directed towards a plasma TV screen displaying a bright white image (FIG. 6*a*), a blue/grey image (FIG. 6*b*) and a dark grey/black image (FIG. 6*c*), all as captured by an oscilloscope set at the same sensitivity and vertical scale. Accordingly, it may be beneficial for a set top box application such as, for example, that described above in conjunction with the flowchart of FIG. 5, to modify the video content displayed on a connected TV apparatus in accordance with these findings during the transmission of infrared-encoded data or command signals to a controlling device or another appliance.

Figure 7:
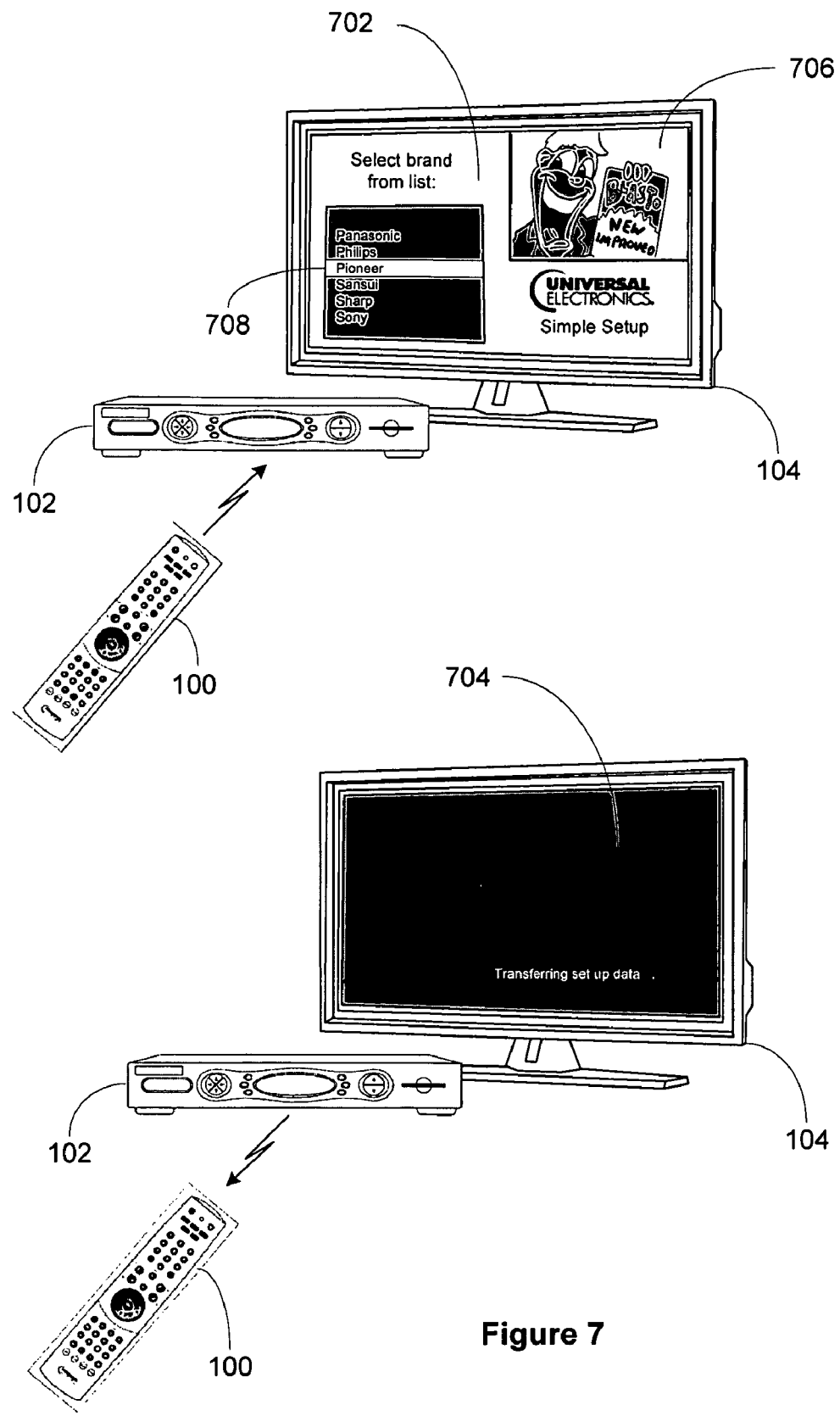
FIG. 7 illustrates an adjustment of TV display content for the purpose of reducing infrared noise produced by a plasma TV screen.

By way of example, FIG. 7 illustrates possible screen displays 702, as may be presented during step 514, and 704, as may be presented during step 520 of the aforementioned application flow. It will be appreciated that the format and content of the displays shown in FIG. 7 is illustrative only and not intended to be limiting, for example, while setup display 702 includes a window 706 in which the current live broadcast video stream continues to be presented, in alternative implementations selection menu 708 may be superimposed on a full-screen live picture, may replace the live picture in its entirety, etc., as is well known in the art. Further, the infrared-friendly display 704 may comprise a generally single hue screen as illustrated, a reduced intensity "grayed out" version of setup display 702, a provider or manufacturer logo display, or any other content selected so as to minimize infrared radiation from a TV screen.

Figure 8:
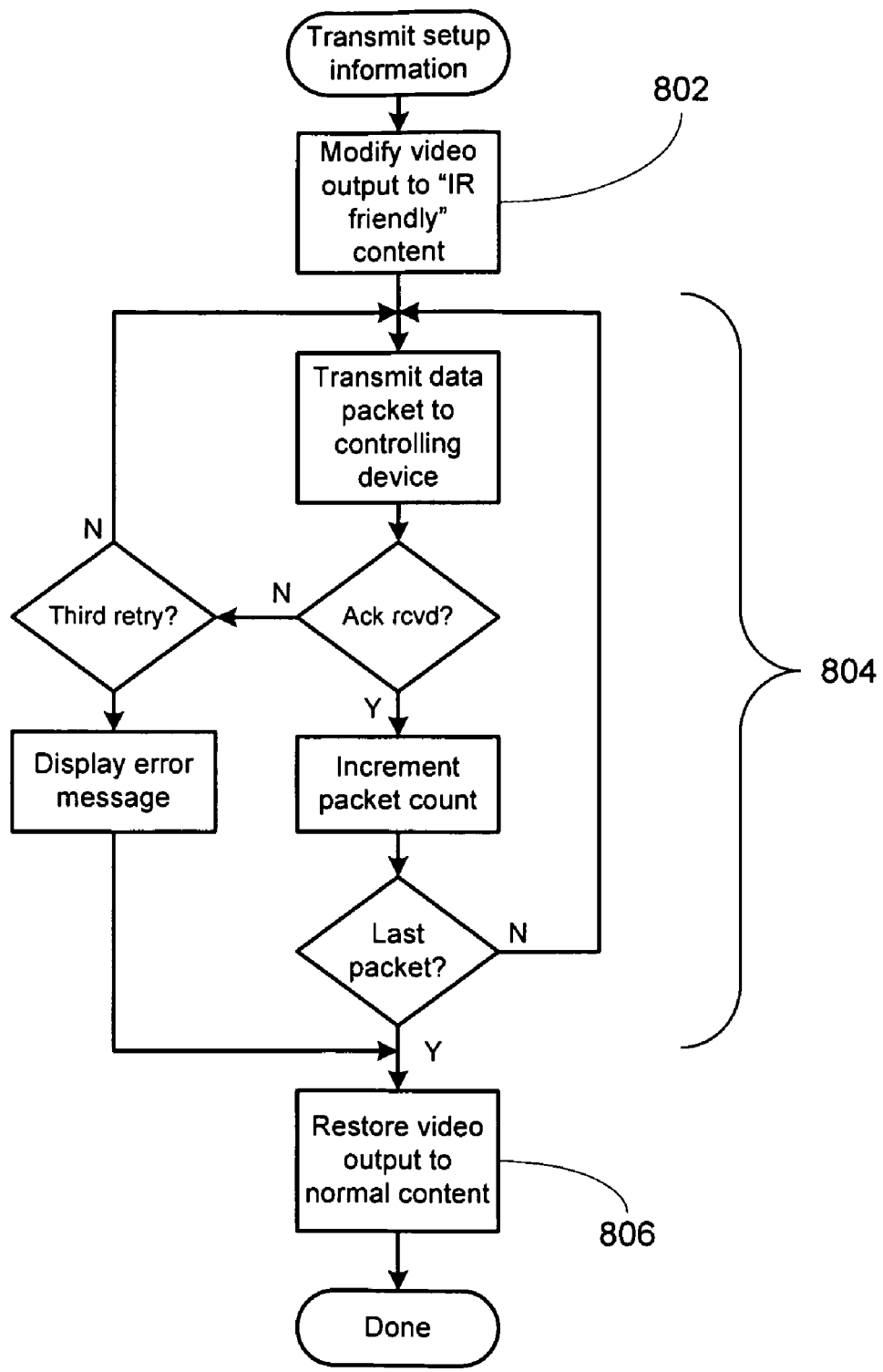
FIG. 8 illustrates in flow chart form an exemplary method for reducing infrared interference during transmission of infrared-encoded data signals.

In one exemplary embodiment, a set top box may routinely modify the video content being output to a connected TV display whenever an infrared encoded communication transmission is taking place. Turning now to FIG. 8, there is generally illustrated a process which may in certain embodiments comprise step 520 of FIG. 5. Upon initiation of the transfer of set up information from set top box 102 to controlling device 100, the set up application may modify 802 the video content being output to TV 104 to comprise an infrared-friendly picture, for example, display 704. Thereafter, the data to be transferred may be transmitted packet-wise 804, with receiver acknowledgement of each packet and re-transmission of incorrectly received packets, all as known in the art. Upon completion of the transfer, the video content being output to TV 104 may be restored 806 to the normal display.

Figure 9:
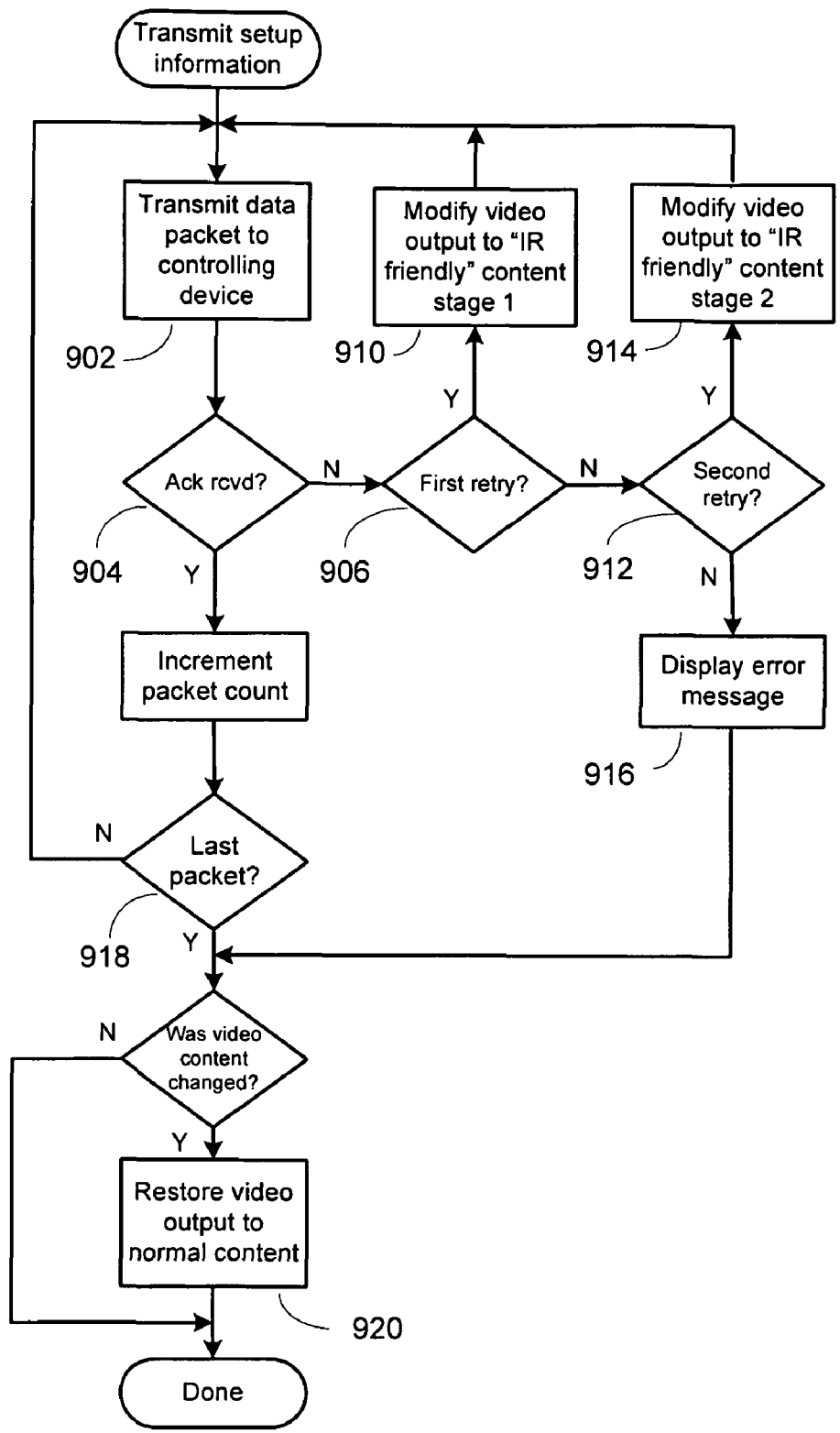
FIG. 9 illustrates in flow chart form a further exemplary method for reducing infrared interference during transmission of infrared-encoded data signals.

In another exemplary embodiment, a set top box may modify the video content being output to a connected TV display in response to failure of its outbound transmissions as evidenced, for example, by lack of an acknowledgement from the receiving device. By way of further example, with reference to FIG. 9, an application resident in an exemplary set top box 102 may transfer set up information to a controlling device 100 as a series of packets 902, each packet to be explicitly acknowledged 904 by the receiving device 100. As packets are positively acknowledged the next packet in sequence is transmitted, continuing until the last packet has been sent 918. However, if at any time a positive acknowledgement is not received (it being understood that this may take the form of an explicit message from the receiving device, e.g., when a packet is received with a bad checksum, or it may be implied from the absence of any response, e.g., after a protocol-specified time out), the set top box application may interpret this as a trigger to modify the video content displayed on a connected device, e.g. TV 104, to a more infrared-friendly form. As illustrated in FIG. 9, such modification of the video content may (but is not required to) occur in stages. For example, a first instance of non-acknowledgement 906 may result in a first stage modification of video content 910 (for example, reduction in intensity of current display), while a second instance of non-acknowledgement 912 may result in a second stage modification of video content 914 (for example, substitution of the current display by a blank screen), and so on. If repeated failures occur (without limitation, three in the example presented) the set top box application may abort the process and display an error message 916 to the user. The error message may simply state that the set up process has been cancelled, or may suggest actions that may be taken by a user to improve the chances of success upon reinitiation of the setup process, for example, moving the TV 104 and the controlling device 100 further apart, bringing the controlling device 100 closer to the set top box 102, reducing the brightness setting of the TV 104, etc. Upon completion or abandonment of the set up process, the set up application may restore any altered video output to the normal content 920 before exiting.

Figure 10:
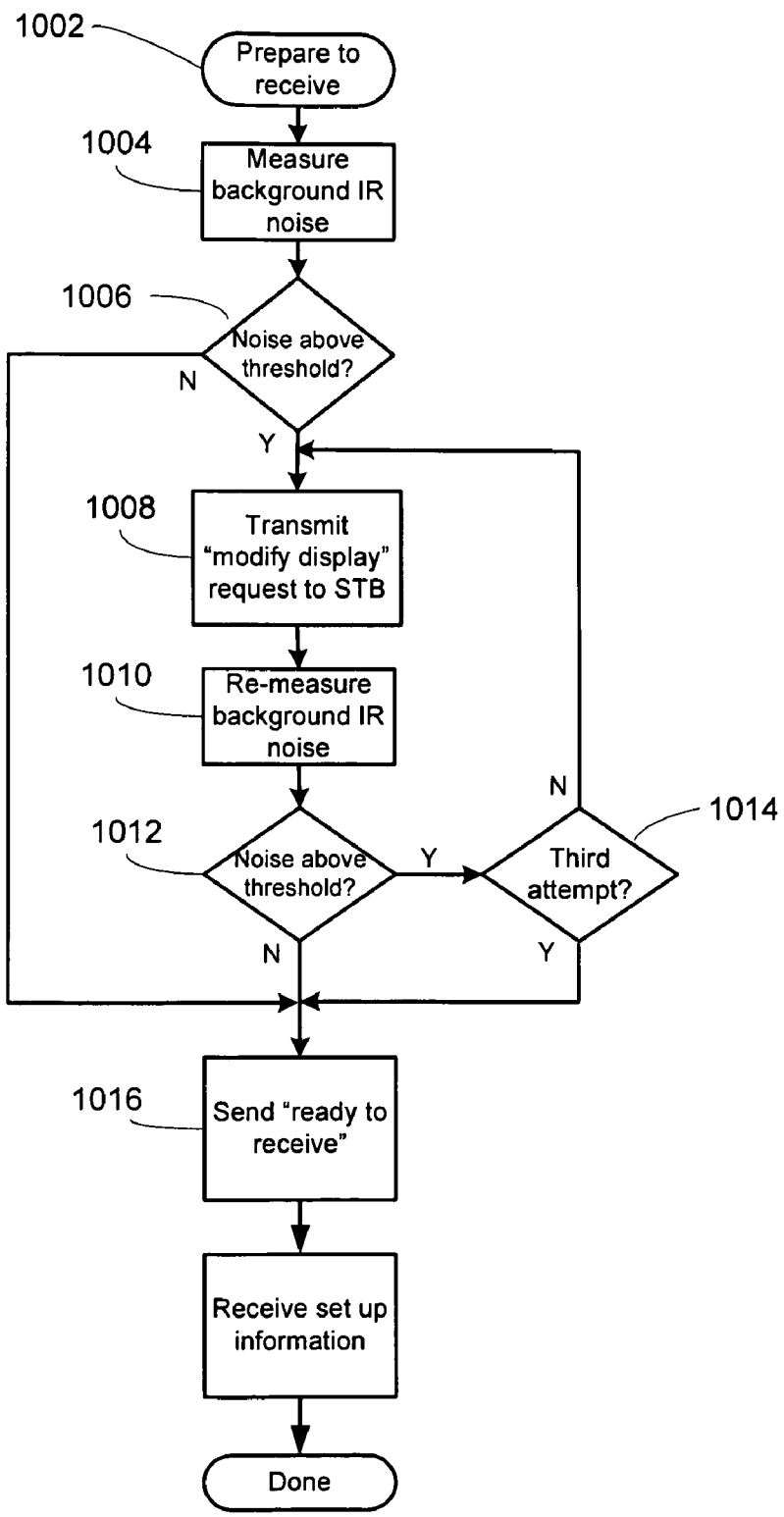
FIG. 10 illustrates in flow chart yet another exemplary method for reducing infrared interference during transmission of infrared-encoded data signals.

In yet another exemplary embodiment, a set top box may modify the video content being output to a connected TV display upon request of the infrared receiving device with which it is conducting a transaction, such request being issued by the receiving device, for example, in response to its detection of infrared noise above an acceptable threshold. In this embodiment, an application resident, for example, in set top box 102, may initiate a transfer transaction with, for example, controlling device 100 by issuing a "prepare to receive" message to the controlling device. As illustrated in FIG. 10, upon receipt 1002 of this message the operating program of controlling device 100 may enable its IR receiver 322,324 and measure the background IR noise level present in the current environment 1004, e.g., the IR noise level created for example by a plasma TV. At step 1006 the operating program may then compare the measured value to a pre-established threshold representing the level at which background IR noise may begin to interfere with reception of IR data signals transmitted from the set top box 102. If the measured IR noise does not exceed the threshold, the operating program may immediately respond with a "ready to receive" message 1016 to set top box 102, after which the transfer of set up information may proceed as described previously, e.g., as illustrated in steps 804 of FIG. 8. If, however, the operating program determines that the IR noise exceeds the threshold, it may instead respond with a request 1008 to the set top box 102 to modify the video content currently being displayed to be infrared friendly. If set top box 102 is equipped to support this feature, it may adjust its video output accordingly. After an appropriate delay to allow any action by the set top box to be completed, the operating program of controlling device may re-measure the background IR noise level 1010, once again comparing it 1012 to the pre-established threshold. If the measured background IR noise level still exceeds the threshold, the request to modify video content may be repeated. In certain implementations, though not required, the application resident in the set top box 102 may utilize such repeated requests to implement multiple stages of infrared-friendly video content modifications in manner similar to that previously described in conjunction with FIG. 9. After a certain number of repeated requests 1014 (without limitation, three in the illustrated embodiment) the operating program of controlling device may transmit a "ready to receive" response and attempt to conduct the setup transaction regardless. Alternatively, if the measured background IR noise level cannot be reduced below the threshold, the operating program may transmit an "cancel" message to the set top box 102, causing, for example, the set up application to abort operation and display a error message, possibly suggesting remedial actions by the user as previously described in conjunction with FIG. 9.

Various other embodiments in which the inventive methods may be applied will be apparent to those of skill in the art. For example, in certain consumer entertainment equipment configurations, video signals from multiple sources (e.g., cable or satellite set top boxes, DVD players, DVRs, personal computers, etc.) may all be routed through a common switching and selection device, e.g., an AV receiver such as 106 of FIG. 1. In such configurations, it will be appreciated that the switching device may be equipped to perform video content substitution in accordance with the instant invention, either in conjunction with its own infrared data transfer operations, or on behalf of other connected devices. In other situations, a device such as for example a DVR, PC, etc. may be equipped with IR command output capability for the control of other, so called "legacy" devices, by way of example a DVR or PC issuing IR commands to a set top box in order to control channel tuning. In such cases, video content substitution in accordance with the instant invention may be utilized to quiet the IR environment while issuing legacy commands, even though in this instance the IR communication may be unidirectional.

It will be additionally appreciated that further background noise reducing techniques are also available for use in addition to those described above. For example, rather than alter content being presented on a plasma TV during a time of IR transmission, the system may provide for a turning off of the IR noise generating appliance (or content providing appliance) during at least the time of IR transmission. For instance, when the plasma TV itself includes the components and programming used to communicate with the controlling device, the plasma TV may reduce IR noise by automatically turning off its video display during times of IR data transmission to the controlling device. Similarly, when the set top box includes the components and programming used to communicate with the controlling device, the set top box may reduce IR noise by automatically turning off its video output during times of IR data transmission to the controlling device, issue a command (or switch power) to turn off the plasma television, etc. In either instance, the appliance, video, etc. may be automatically turned back on upon completion of the IR transmission process. The aforementioned appliances may also cause the display of a message to the user prior to implementing a turn-off condition to notify the user of the turn-off.

Still further, the controlling device may be used to automatically turn-off an appliance during times of IR transmission from an appliance, e.g., the set top box, to the controlling device. For example, the IR transmission process may include the controlling device transmitting to the set top box a "ready to receive IR transmission" signal to which the set top box responds by initiating IR transmissions to the controlling device. Preferably, a key actuation would be used to cause the controlling device to transmit the "ready to receive IR transmission" signal. In connection with the transmitting of the "ready to receive IR transmission" signal, the controlling device can also issue a command to the plasma TV for the purpose of turning off the plasma TV. Then, once all of the data being transmitted by the set top box has been received by the controlling device, the controlling device can automatically send to the plasma TV a command for the purpose of turning on the plasma TV.

While various concepts have been described in detail, it will be appreciated by those skilled in the art that various modifications and alternatives to those concepts could be developed in light of the overall teachings of the disclosure. For example, while specific illustrative embodiments are presented above in the context of an interactive controlling device setup application, it will be appreciated that in alternate embodiments the inventive methods and techniques described herein may be generally applied to any situation in which infrared communication is to be transacted in an environment subject to interference from a display content-related source of infrared noise. Similarly, while specific illustrative embodiments are presented in which a plasma television is the source of IR noise, it will be appreciated that the systems and methods described herein are equally usable to facilitate IR communications in the presence of IR noise sources beyond just the described plasma television.

Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A method for facilitating infrared (IR) communications from a first device to a second device in the presence of an IR noise source, comprising:
   initiating an IR transmission from the first device to the second device; and
   using at least one of the first device and the second device to actively reduce a level of IR noise being generated by the IR noise source during the IR transmission;
   wherein the IR noise source comprises a display device and wherein the first device comprises a device adapted to provide content to the display device and the second device comprises a controlling device adapted to control functions of at least the first device.

2. The method as recited in claim 1, wherein the IR transmission comprises controlling device configuration data.

3. A method for facilitating infrared (IR) communications from a first device to a second device in the presence of an IR noise source, comprising:
   initiating an IR transmission from the first device to the second device; and
   using at least one of the first device and the second device to actively reduce a level of IR noise being generated by the IR noise source during the IR transmission;
   wherein the IR noise source comprises a display device and the step of using at least one of the first device and the second device comprises adjusting content that is being presented on the display device during the IR transmission to actively reduce a level of IR noise being generated by the display device.

4. The method as recited in claim 3, wherein adjusting content comprises inhibiting presentation of content during the IR transmission.

5. The method as recited in claim 3, wherein adjusting content comprises causing an image to be superimposed with content.

6. The method as recited in claim 3, wherein adjusting content, comprises replacing content with an image.

7. The method as recited in claim 3, wherein the first device comprises a device adapted to provide content to the display device and the first devices adjusts content that is being presented on the display device during the IR transmission to actively reduce a level of IR noise being generated by the display device.

8. The method as recited in claim 7, wherein the first device adjusts content by inhibiting presentation of content during the IR transmission.

9. The method as recited in claim 7, wherein the first device adjusts content by causing an image to be superimposed with content.

10. The method as recited in claim 3, wherein the first device adjusts content by replacing content with an image.

11. A method for facilitating infrared (IR) communications from a first device to a second device in the presence of an external IR noise being generated by a third device, comprising:
    initiating an IR transmission from the first device to the second device; and
    using the first device to actively reduce a level of external IR noise being generated by the third device during the IR transmission in response to a notification provided to the first device from the second device.

12. The method as recited in claim 11, wherein the second device provides the notification to the first device when the IR transmission from the first device failed to reach the second device.

13. The method as recited in claim 12, comprising using the first device to actively reduce a level of external IR noise being generated by the third device during the IR transmission in stages in response to repeated notifications provided to the first device from the second device that the IR transmission from the first device failed to reach the second device.

14. The method as recited in claim 11, wherein the second device provides the notification to the first device when the external IR noise being generated by the third device is determined by the second device to surpass a threshold value.

15. The method as recited in claim 14, wherein the first device comprises a settop box and the third device comprises a plasma television.

16. The method as recited in claim 14, comprising using the first device to actively reduce a level of external IR noise being generated by the third device during the IR transmission in stages in response to repeated notifications provided to the first device from the second device that external IR noise being generated by the third device is determined by the second device to surpass a threshold value.

17. A method for facilitating infrared (IR) communications from a set top box device to a remote control device in the presence of a display device in content communication with the set top box, comprising:

initiating an IR transmission from the set top box device to the remote control device; and using the set top box device to adjust content that is being presented on the display device to actively reduce a level of IR noise being generated by the display device during the IR transmission.

18. The method as recited in claim 17, wherein the display device comprises a plasma television.

19. The method as recited in claim 17, wherein the set top box adjusts content that is being presented on the display device by inhibiting presentation of content.

20. The method as recited in claim 17, wherein the set top box adjusts content that is being presented on the display device by superimposing an image with content being provided to the display device.

21. The method as recited in claim 17, wherein the set top box adjusts content that is being presented on the display device by replacing content being provided to the display device with an image.

* * * * *